US012548544B1

(12) United States Patent
Saux et al.

(10) Patent No.: US 12,548,544 B1
(45) Date of Patent: Feb. 10, 2026

(54) FEEDFORWARD AND FEEDBACK HEADPHONE ACOUSTIC NOISE CANCELLATION

(71) Applicant: Apple Inc., Cupertino, CA (US)

(72) Inventors: Tom-Davy W. Saux, Los Altos, CA (US); Victoria Chiu, San Jose, CA (US); Hanchi Chen, San Jose, CA (US); Mark Noon, San Jose, CA (US); Vladan Bajic, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 747 days.

(21) Appl. No.: 17/903,813

(22) Filed: Sep. 6, 2022

(51) Int. Cl.
*G10K 11/178* (2006.01)
*H04R 1/10* (2006.01)

(52) U.S. Cl.
CPC .. *G10K 11/17817* (2018.01); *G10K 11/17823* (2018.01); *G10K 11/17825* (2018.01); *G10K 11/17881* (2018.01); *H04R 1/1083* (2013.01); *G10K 2210/1081* (2013.01); *G10K 2210/30232* (2013.01); *G10K 2210/3026* (2013.01); *G10K 2210/3027* (2013.01); *G10K 2210/3028* (2013.01); *G10K 2210/3044* (2013.01); *H04R 2460/01* (2013.01)

(58) Field of Classification Search
CPC ....... G10K 11/17817; G10K 11/17823; G10K 11/17825; G10K 11/17881; G10K 2210/1081; G10K 2210/30232; G10K 2210/3026; G10K 2210/3027; G10K 2210/3028; G10K 2210/3044; H04R 1/1083; H04R 2460/01
USPC .............................................. 381/71.6, 71.11
See application file for complete search history.

(56) References Cited

U.S. PATENT DOCUMENTS

| | | | | |
|---|---|---|---|---|
| 5,359,665 | A | 10/1994 | Werrbach | |
| 7,016,509 | B1 | 3/2006 | Bharitikar et al. | |
| 7,171,010 | B2 | 1/2007 | Martin et al. | |
| 8,275,152 | B2 | 9/2012 | Smirnov et al. | |
| 8,447,045 | B1 * | 5/2013 | Laroche ........... | G10K 11/17825 381/71.8 |
| 8,693,700 | B2 | 4/2014 | Bakalos et al. | |
| 9,264,823 | B2 | 2/2016 | Bajic et al. | |
| 9,515,629 | B2 | 12/2016 | Goldstein et al. | |
| 9,633,646 | B2 | 4/2017 | Hendrix et al. | |
| 10,034,092 | B1 | 7/2018 | Nawfal et al. | |
| 10,074,903 | B2 | 9/2018 | Kim et al. | |

(Continued)

FOREIGN PATENT DOCUMENTS

| | | |
|---|---|---|
| EP | 2239728 | 10/2010 |

OTHER PUBLICATIONS

"Bose QuietComfort Earbuds", Retrieved from the Internet <https://www.bose.com/en_us/products/headphones/earbuds/quietcomfort-earbuds.html#v=qc_earbuds_black, Sep. 10, 2020, 15 pages.

(Continued)

*Primary Examiner* — Xu Mei
(74) *Attorney, Agent, or Firm* — Aikin & Gallant, LLP

(57) ABSTRACT

A processor is configured to determine, using an adaptive filter algorithm, an adaptive feedforward acoustic noise cancellation, ANC, filter, filter a headphone internal microphone signal using a feedback filter to produce a feedback audio signal, drive a headphone speaker with the feedback audio signal, and modify the feedback filter based on a characteristic of the adaptive feedforward ANC filter. Other embodiments are also described.

17 Claims, 3 Drawing Sheets

(56) References Cited

U.S. PATENT DOCUMENTS

| | | | | |
|---|---|---|---|---|
| 11,166,099 | B2 * | 11/2021 | Saux | G10K 11/17833 |
| 11,335,316 | B2 * | 5/2022 | Chen | G10K 11/17827 |
| 11,445,290 | B1 * | 9/2022 | Grinker | G10K 11/17825 |
| 11,678,116 | B1 * | 6/2023 | Kontomichos | H04R 3/02 381/94.9 |
| 2003/0145025 | A1 | 7/2003 | Allred et al. | |
| 2004/0032959 | A1 | 2/2004 | Montag et al. | |
| 2008/0175409 | A1 | 7/2008 | Lee et al. | |
| 2010/0195815 | A1 | 8/2010 | Tada | |
| 2010/0266134 | A1 | 10/2010 | Wertz et al. | |
| 2011/0007907 | A1 | 1/2011 | Park et al. | |
| 2011/0142247 | A1 | 6/2011 | Fellers et al. | |
| 2013/0259250 | A1 | 10/2013 | Nicholson et al. | |
| 2013/0287219 | A1 * | 10/2013 | Hendrix | G10K 11/175 381/71.6 |
| 2014/0093090 | A1 | 4/2014 | Bajic et al. | |
| 2014/0341388 | A1 | 11/2014 | Goldstein et al. | |
| 2016/0300562 | A1 | 10/2016 | Goldstein | |
| 2017/0125006 | A1 * | 5/2017 | Dzhigan | G10K 11/17881 |
| 2017/0133000 | A1 | 5/2017 | Hendrix et al. | |
| 2018/0047383 | A1 | 2/2018 | Hera et al. | |
| 2019/0130930 | A1 | 5/2019 | Tong et al. | |
| 2020/0098347 | A1 | 3/2020 | Kubota et al. | |
| 2020/0374617 | A1 | 11/2020 | Liu et al. | |
| 2021/0097970 | A1 | 4/2021 | Saux et al. | |
| 2021/0099799 | A1 | 4/2021 | Saux et al. | |
| 2022/0301538 | A1 * | 9/2022 | Wang | G10K 11/17817 |

OTHER PUBLICATIONS

Bristow-Johnson, Robert, "Cookbook formulae for audio equalizer biquad filter coefficients", Retrieved from the Internet <https://www.w3.org/2011/audio/audio-eq-cookbook.html>, May 29, 2020, 7 pages.

* cited by examiner

FEEDFORWARD AND FEEDBACK HEADPHONE ACOUSTIC NOISE CANCELLATION

FIELD

An aspect of the disclosure here relates to digital signal processing techniques for improving acoustic noise cancellation performance. Other aspects are also described.

BACKGROUND

An acoustic noise cancellation technique, ANC, electronically or "actively" cancels the ambient noise that has leaked its way past a headphone's passive sound barrier into the wearers ear, by generating an appropriate anti-noise signal. In many consumer audio electronics applications of ANC, a digital filter referred to as an adaptive feedforward ANC filter produces the anti-noise signal that is adapted automatically by an adaptive filter algorithm, while the headphone is being worn and used, based on the changing acoustic conditions in the interface between the headphone speaker and the wearer's ear. This is typically done by a digital processor that is computing and updating in real-time an S path estimate, which is an estimate of a so-called secondary path transfer function S(z) that describes how an internal microphone in the headphone responds when an impulse signal is driving the headphone speaker. The adaptive filter engine updates the feedforward ANC filter in real time, based on the S path estimate and based on the internal microphone signal (which measures the sound in the interface between the headphone speaker and the ear), intending to shape the anti-noise produced by the headphone speaker in such a way that acoustically cancels the ambient noise that has leaked past the headphone and into the wearers ear.

SUMMARY

For acoustically leaky headphones, such as for example loose-fitting earbuds and over the ear headphones that are worn over eyeglasses, the performance of ANC may be improved by using a hybrid arrangement in which the anti-noise signal produced by the adaptive feedforward ANC filter is combined with a feedback audio signal, to drive the headphone speaker. The feedback audio signal is produced by an adaptive feedback filter which is filtering the internal microphone signal of the headphone. Now, there is significant variation in acoustic leakage, for a given headphone design, due to the different fit between different users, and this variation in acoustic leakage results in an undesirably wide variation in the ambient noise attenuation achieved by the ANC subsystem. It has been determined that this variation in noise attenuation is reduced (across different headphone fits) and the stability of the ANC may be enhanced, if the ANC automatically modifies the feedback filter based on a characteristic of the adaptive feedforward ANC filter, while the latter is being updated in real time. In one aspect, this may be achieved by modifying the operation of a frequency domain adaptive filter algorithm which is defining the feedback filter, wherein the frequency domain adaptive filter algorithm is modified based on the characteristic of the adaptive feedforward ANC filter.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

In various aspects, the description here is made with reference to figures. However, certain aspects may be practiced without one or more of the specific details shown, or in combination with other known methods and configurations that are not shown. The aspects are thus illustrated by way of example and not by way of limitation in the figures in which like references indicate similar elements. Also, in the interest of conciseness and reducing the total number of figures, a given figure may be used to illustrate the features of more than one aspect, and not all elements in the figure may be required for a given aspect.

DETAILED DESCRIPTION

In the following description, numerous specific details are set forth, such as specific configurations, dimensions, and processes, to provide a thorough understanding of the various aspects. In other instances, well-known processes and manufacturing techniques have not been described in particular detail in order to not unnecessarily obscure the description. Reference throughout this specification to "one aspect," "an aspect," or the like, means that a particular feature, structure, configuration, or characteristic described is included in at least one aspect. Thus, the appearance of the phrase "one aspect," "an aspect," or the like, in various places throughout this specification are not necessarily referring to the same aspect. Furthermore, the features, structures, configurations, or characteristics described may be combined in any suitable manner in one or more aspects.

Figure 1:
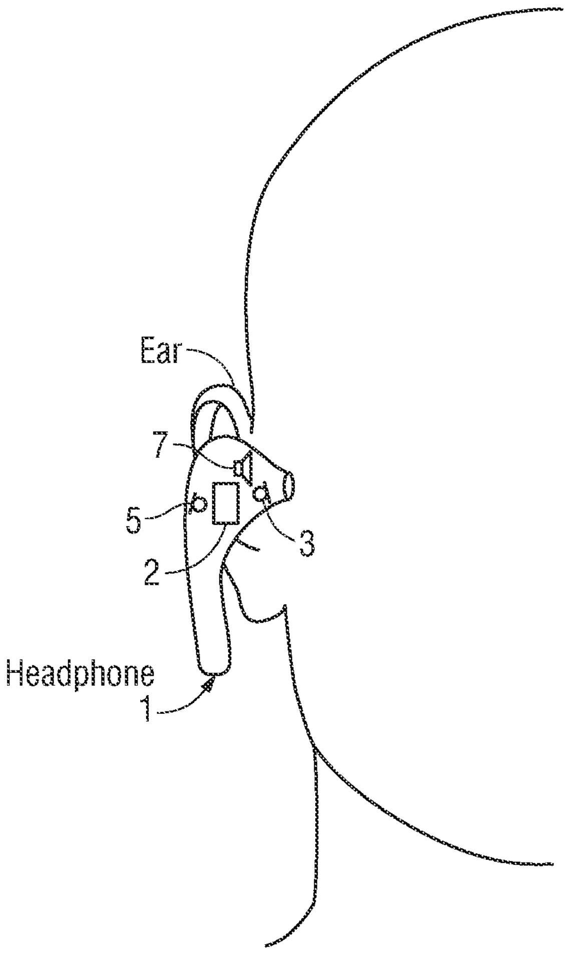
FIG. 1 illustrates an example headphone audio apparatus.

FIG. 1 illustrates an example headphone 1 worn by a user (a person or wearer) who may be in a noisy ambient sound environment. There is undesired ambient sound that would be heard by the wearer despite the passive sound insulation provided by the headphone 1, such as for example engine noise, crowd noise, or road noise. The headphone 1 may be either the left headphone or the right headphone of a headset. The headset may be an over-the-ear headset, an on-the-ear headset, or an in-ear headset (also referred to as earbuds, that may be loose fitting.)

The headphone 1 is part of an audio apparatus or system that has a digital audio processor 2, one or more external microphones also referred to here as a reference microphone 5, at least one internal microphone also referred to here as an error microphone 3, and a speaker 7, all of which may be integrated within a housing of the headphone 1 as shown in the figure. The error microphone 3 is arranged and configured to directly receive the sound reproduced by the speaker 7, while the reference microphone 5 is arranged and configured to directly receive ambient sound. The headphone 1 may be in wireless data communication with for example a companion device (not shown) such as a smartphone or tablet computer. A user content audio signal (e.g., a downlink call signal containing the voice of another participant in a call, a media playback signal containing music) drives the speaker 7. The headphone 1 may receive the user content audio signal directly from the companion device, or it may receive the user content audio signal directly from a mobile cellular network station.

The processor 2 is part of an ANC subsystem that electronically or "actively" cancels the ambient noise that has leaked its way past the passive sound barrier of the headphone 1 into the wearers ear, by driving the speaker 7 with an anti-noise signal. The user content audio may also be driving the same speaker 7 simultaneously with the anti-noise; it may be quiet (e.g., the wearer has pressed a mute button or turned down a sound volume knob), or it may not be, during the ANC mode of operation (while the headphone 1 is worn.) In the ANC mode, the processor 2 implements a digital filter referred to as an adaptive feedforward ANC filter which produces the anti-noise signal that is adapted automatically by an adaptive filter algorithm (being performed by the processor 2), based on the acoustic conditions in the interface between the speaker 7 and the ear as detected by the error microphone 3. This may be achieved by the processor 2 obtaining an S path estimate, which is an estimate of a so-called secondary path transfer function S(z) that describes how the error microphone 3 responds when an impulse signal is driving the speaker 7. The S path estimate is then used by the processor 2 to perform the adaptive filter algorithm to repeatedly update the feedforward ANC filter, based on the reference microphone signal and the error microphone signal where the latter measures the sound in the acoustic interface between the speaker and the ear. A goal of the ANC subsystem is to attenuate through acoustic cancellation the ambient noise that has leaked past the headphone 1 and into the wearers ear.

Figure 2:
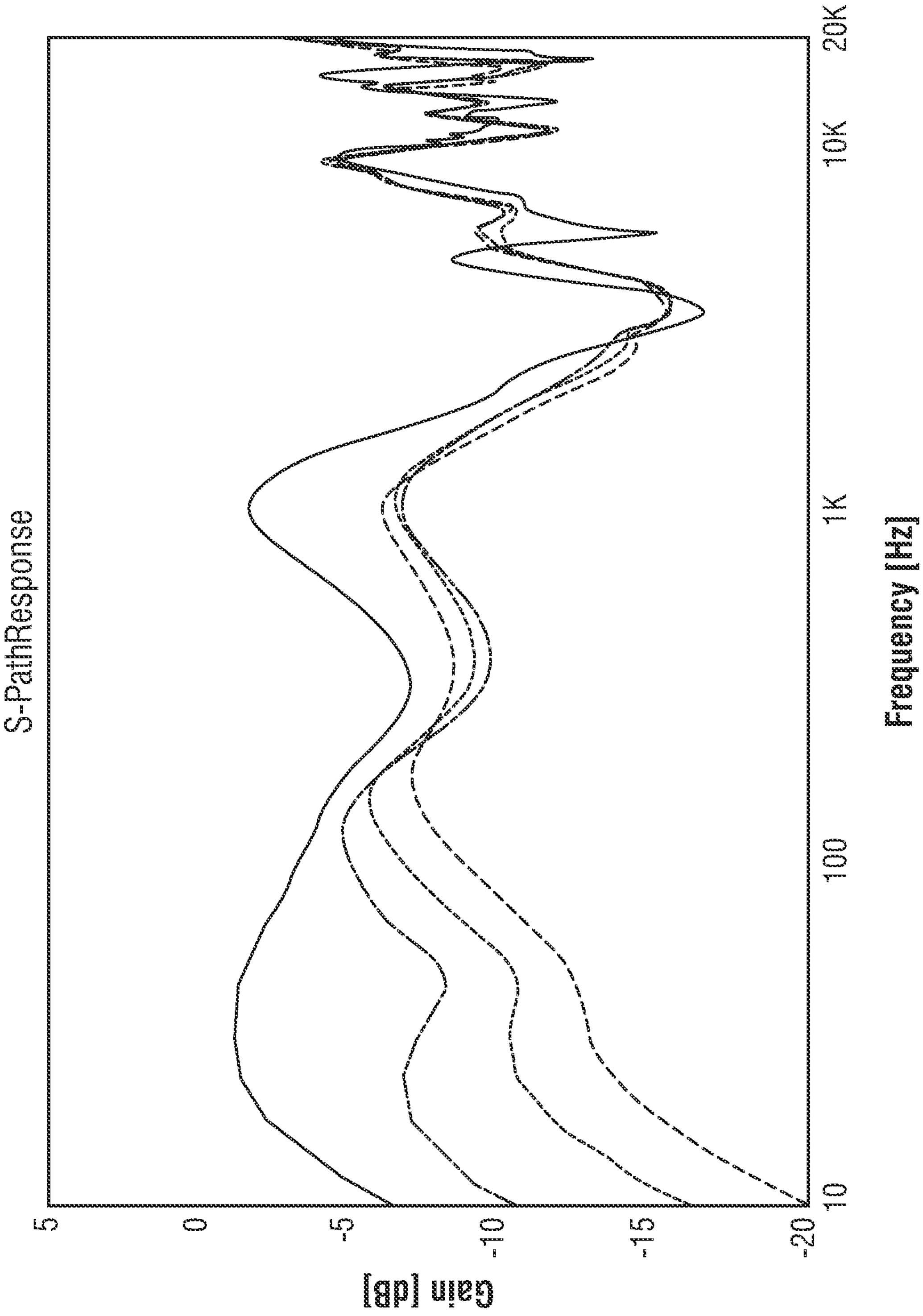
FIG. 2 shows an example variation in the secondary path transfer function that is due to different fits between a headphone and the users' ear.

For the ANC subsystem to properly tailor its anti-noise, to cancel as much of the ambient noise as possible, it needs accurate knowledge of the acoustic interface between the speaker 7 and the wearers ear drum. An estimate of the secondary path transfer function S(z) comes somewhat close to this goal, but the acoustic interface and therefore the actual S(z) varies greatly across different users due to varying headphone fit. FIG. 2 shows an example of variation in the magnitude response of S(z), across users with varying fit between a particular headphone design and the users' ears. The dotted line curves are for different levels of acoustically leaky fits, while the solid line curve is for a sealed fit. An online (real time, during use of the headphone 1) frequency domain adaptive filter algorithm (FDAF) may be added to the ANC subsystem, to repeatedly estimate S(z).

Figure 3:
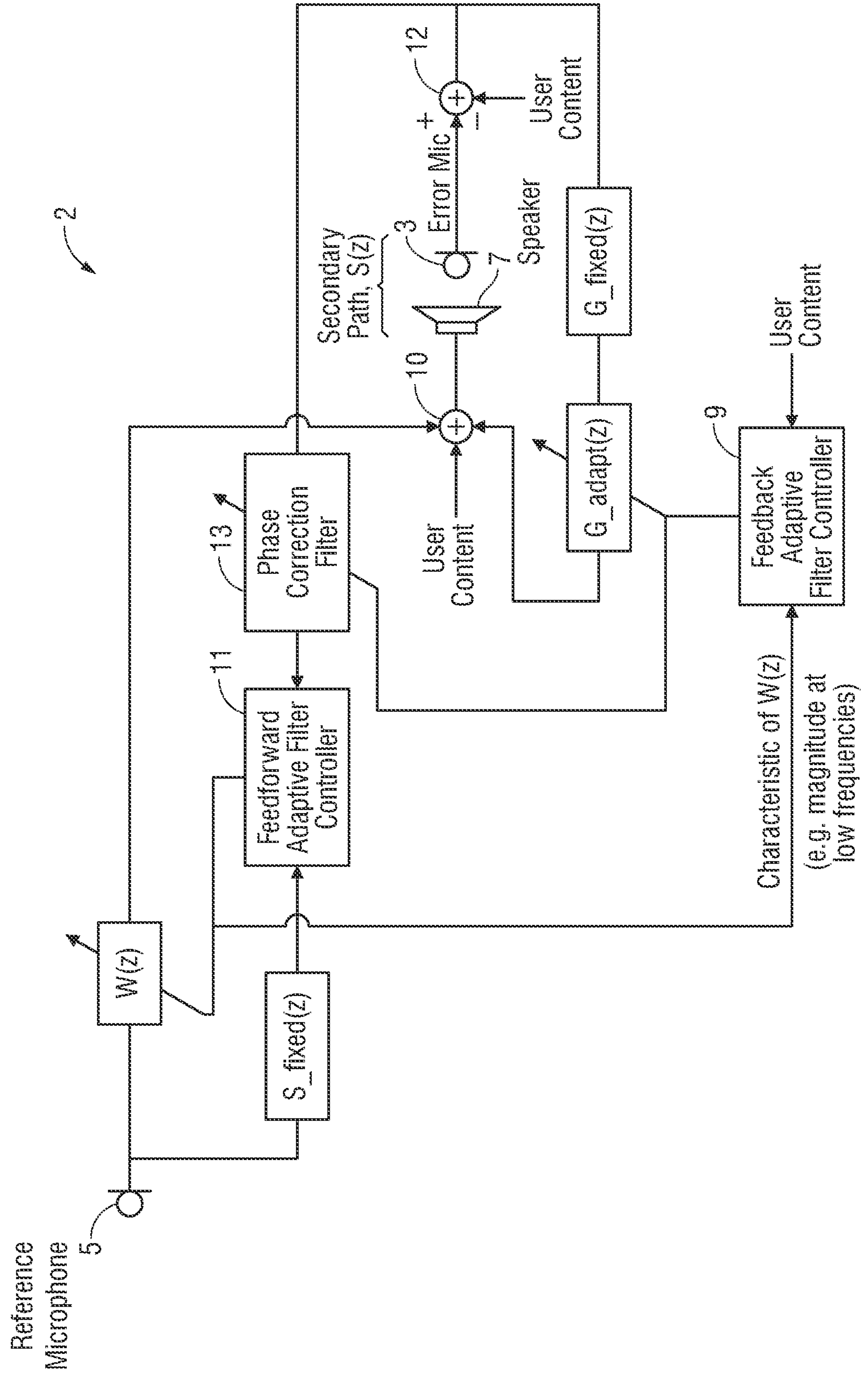
FIG. 3 is a block diagram of an example ANC subsystem for headphones.

Referring now to the block diagram of FIG. 3, this is a block diagram of an example of the processor 2 configured to perform a digital audio signal processing method of headphone ANC. This is referred to as a hybrid (feedforward and feedback) arrangement, where W(z) is the transfer function of an adaptive feedforward ANC filter, and G_adapt(z) is the transfer function of a feedback filter. Both filters produce audio signals that are combined with user content audio, as represented by a first summing junction 10 in the figure, to drive the speaker 7.

As shown in the figure, the G_adapt(z) feedback filter is added into an audio signal path that is from the output of the error microphone 3, after user content audio removal, as represented by a second summing junction 12 in the figure, to the input of the speaker 7. In one aspect, as shown in the figure, there is also a fixed or time invariant feedback filter G_fixed(z) that is in cascade with the feedback filter. The feedback filter G_adapt(z) may be designed to operate over a wide audio frequency band, e.g., 10 Hz to 10 kHz, not just in a low frequency band, e.g., less than 150 Hz where ANC is typically more effective and consistent. A feedback adaptive filter controller 9 adapts (modifies) G_adapt(z) online, based on the characteristic of the adaptive feedforward ANC filter W(z). In this manner, the addition of the feedback filter helps the ANC subsystem to more consistently reduce the ambient noise that has leaked past the headphone's passive isolation and into the ear, despite variation in how the headphone fits the ear. As a result, the headphone 1 performs more consistently across different users.

In one aspect of the ANC mode of operation, the G_adapt(z) feedback filter is active or enabled both when the user content audio is not quiet (e.g., the wearer of the headphone can hear music or the voice of another caller, that is driving the speaker 7), and when the user content audio signal is quiet. Updates are being made to the G_adapt(z) filter, by the feedback adaptive filter controller 9, regardless of whether sound stimulus is being injected by the speaker 7 into the S path, e.g., the user content audio is quiet.

The following explains why the feedback adaptive filter controller 9 should be configured to modify G_adapt(z) based on a characteristic of W(z). Recall that the feedforward adaptive filter controller 11 (e.g., implemented as an FDAF) determines W(z) in an online process, while the feedback adaptive filter controller 9 determines G_adapt(z). Now, the term P(z) is a so-called primary path transfer function which describes how an impulse sound produced in in the ambient, say near the reference microphone 5, travels past the housing of the headphone 1 and is picked up by the error microphone 3 (primary path.) The feedforward adaptive filter controller 11 aims to determine W(z) such that W(z)=−P(z) S(z). It can be shown that the feedback adaptive filter controller 9 (e.g., implemented as an FDAF) aims to determine G_adapt(z) as being proportional to 1/S(z). An observation can be made that P(z) can be reasonably estimated to be a known constant (fixed or time-invariant), e.g., unity, or zero dB, at low frequencies such as below 150 Hz, or below 100 Hz. These several items taken together lead to a conclusion that G_adapt(z) is proportional to W(z) in the low frequencies. In one aspect, this is performed only when the user content audio is quiet. In another aspect, this is performed both when the user content audio is quiet and when the user content audio is not quiet. Note that in one aspect, W(z) continues to be updated by the feedforward adaptive filter controller 11 both when the user content audio is quiet and when it is not. This understanding can be applied to stabilize and improve performance of the ANC, by modifying G_adapt(z) based on a characteristic of W(z). This is depicted in the figure as a control arrow from the feedback adaptive filter controller 9 through the G_adapt(z) box. In one aspect, the feedback adaptive filter controller 9 is modified so that it updates the G_adapt(z) filter to be directly proportional to W(z), In other words, the G_adapt(z) filter 9 is modified in response to, e.g., whenever, W(z) is modified—this is depicted by the control arrow going from the boxes representing W(z) and the feedforward adaptive filter control 11 to the box representing the feedback adaptive filter controller 9. Note that in one aspect, this adaptation of G_adapt(z) is taking place both when the user content audio is quiet and when it is not quiet, while in another aspect it is taking place only when the user content audio is quiet.

In one aspect, the characteristic of the adaptive feedforward ANC filter W(z) based on which G_adapt(z) is modified is a magnitude response of the adaptive feedforward ANC filter at frequencies below 150 Hz, and more particularly at frequencies below 100 Hz. In other words, only the low frequency magnitude response of W(z) is considered, e.g., below 150 Hz, not its high frequency response (e.g., above 150 Hz) when updating G_adapt(z).

Still referring to FIG. 3, another aspect of the disclosure shown in that figure is that the processor 2 may be further configured to determine the adaptive feedforward ANC filter W(z) by performing its adaptive filter algorithm using an S path estimate S_fixed(z) which estimates the secondary path transfer function S(z) as a fixed or time-invariant transfer function, rather than as a real time online adaptive version. In that case, there may be no need for another real time, online adaptive filter algorithm that is computing updates to the S path estimate. The S_fixed(z) filter may be computed during laboratory experimentation to be within +/−45 degrees of a true secondary path transfer function of an instance of the headphone 1 being worn by a test user and is then stored within memory of the headphone 1 for use by the processor 2. In one aspect, the adaptation of W(z) by the feedforward adaptive filter controller 11 (e.g., performing an FX LMS algorithm or other suitable frequency domain adaptive filter algorithm) is taking place both when the user content audio is quiet and when it is not quiet.

FIG. 3 shows another optional feature, namely the addition of a phase correction filter 13 that is filtering the error microphone signal (e.g., a user content removed version of the output of the error microphone 3) before the error microphone signal is provided as a second control input to the feedforward adaptive filter controller 11 (where a first control input to the feedforward adaptive filter controller 11 is an S_fixed(z) filtered version of the output of the reference microphone 5.) In one aspect, the phase correction filter 13 is modified in response to, e.g., whenever, G_adapt(z) is modified—this is depicted by the two control arrows sharing their source at the box representing the feedback adaptive filter controller 9. In this manner, operation of the ANC may be stabilized even further.

While certain aspects have been described above and shown in the accompanying drawings, it is to be understood that such descriptions are merely illustrative of and not restrictive on the invention, and that the invention is not limited to the specific constructions and arrangements shown and described, since various other modifications may occur to those of ordinary skill in the art.

What is claimed is:

1. An audio signal processing method for a headphone, the method comprising:

determining, using a first adaptive filter algorithm, an adaptive feedforward acoustic noise cancellation (ANC) filter, wherein determining the adaptive feedforward ANC filter includes performing the first adaptive filter algorithm using a secondary (S) path estimate, the S path estimate estimating a secondary path transfer function of the headphone as a fixed or time-invariant transfer function;

filtering an internal microphone signal of the headphone using a feedback filter to produce a feedback audio signal;

driving a speaker of the headphone with the feedback audio signal; and modifying the feedback filter based on a characteristic of the adaptive feedforward ANC filter.

2. The method of claim 1 further comprising filtering an external microphone signal of the headphone using the adaptive feedforward ANC filter to produce a feedforward anti-noise signal, wherein driving the speaker comprises driving the speaker with the feedforward anti-noise signal as combined with the feedback audio signal.

3. The method of claim 2 further comprising driving the speaker with a user content audio signal as combined with both the feedforward anti-noise signal and the feedback audio signal.

4. The method of claim 3 further comprising:

filtering the internal microphone signal using a phase correction filter; and in response to the feedback filter being modified, modifying the phase correction filter.

5. The method of claim 3 wherein modifying the feedback filter occurs both when the user content audio signal is not quiet and when the user content audio signal is quiet.

6. The method of claim 2 wherein modifying the feedback filter comprises modifying a second adaptive filter algorithm that defines the feedback filter, wherein the second adaptive filter algorithm is modified based on the characteristic of the adaptive feedforward ANC filter.

7. The method of claim 1 wherein the characteristic of the adaptive feedforward ANC filter is a magnitude response of the adaptive feedforward ANC filter at frequencies below 150 Hz.

8. The method of claim 1 wherein the characteristic of the adaptive feedforward ANC filter is a magnitude response of the adaptive feedforward ANC filter at frequencies below 100 Hz.

9. The method of claim 1 wherein the characteristic of the adaptive feedforward ANC filter is a magnitude response of the adaptive feedforward ANC filter at frequencies below 150 Hz.

10. The method of claim 1 wherein determining the adaptive feedforward ANC filter comprises performing the first adaptive filter algorithm using an S path estimate, wherein the S path estimate estimates a secondary path transfer function of the headphone as a fixed or time-invariant transfer function, and wherein the first adaptive filter algorithm is performed to determine the adaptive feedforward ANC filter both when the user content audio signal is not quiet and when the user content audio signal is quiet.

11. A headphone audio apparatus comprising a headphone housing having integrated therein a speaker, an internal microphone to produce an internal microphone signal, and an external microphone to produce an external microphone signal; and a processor configured to:

determine, using a first adaptive filter algorithm, an adaptive feedforward acoustic noise cancellation (ANC) filter, wherein the processor is configured to determine the adaptive feedforward ANC filter by performing the first adaptive filter algorithm using a secondary (S) path estimate, the S path estimate estimating a secondary path transfer function of the headphone as a fixed or time-invariant transfer function;

filter the internal microphone signal using a feedback filter to produce a feedback audio signal;

drive the speaker with the feedback audio signal; and modify the feedback filter based on a characteristic of the adaptive feedforward ANC filter.

12. The headphone audio apparatus of claim 11 wherein the processor is integrated in the headphone housing.

13. The headphone audio apparatus of claim 12 wherein the processor is further configured to:

filter the external microphone signal using the adaptive feedforward ANC filter to produce a feedforward anti-noise signal; and drive the speaker by driving the speaker with the feedforward anti-noise signal as combined with the feedback audio signal.

14. The headphone audio apparatus of claim 13 wherein the processor is further configured to drive the speaker with a user content audio signal as combined with both the feedforward anti-noise signal and the feedback audio signal.

15. The headphone audio apparatus of claim 14 wherein the processor is configured to modify the feedback filter both when the user content audio signal is not quiet and when the user content audio signal is quiet.

16. An apparatus for use with a headphone, the apparatus comprising a processor configured to:

determine, using an adaptive filter algorithm, an adaptive feedforward acoustic noise cancellation (ANC) filter, wherein the processor is configured to determine the adaptive feedforward ANC filter by performing the first adaptive filter algorithm using a secondary (S) path estimate, the S path estimate estimating a headphone secondary path transfer function as a fixed or time-invariant transfer function;

filter a headphone internal microphone signal using a feedback filter to produce a feedback audio signal;

drive a headphone speaker with the feedback audio signal; and modify the feedback filter based on a characteristic of the adaptive feedforward ANC filter.

17. The apparatus of claim 16 wherein the characteristic of the adaptive feedforward ANC filter is a magnitude response of the adaptive feedforward ANC filter at frequencies below 150 Hz.

* * * * *